United States Patent [19]
Murasaki

[11] Patent Number: 5,537,793
[45] Date of Patent: Jul. 23, 1996

[54] JOINT STRUCTURE OF PANEL-LIKE COMPONENTS

[75] Inventor: Ryuichi Murasaki, Toyama-ken, Japan

[73] Assignee: YKK Corporation, Tokyo, Japan

[21] Appl. No.: 396,523

[22] Filed: Mar. 1, 1995

[30] Foreign Application Priority Data

Apr. 5, 1994 [JP] Japan ................................. 6-067422

[51] Int. Cl.⁶ ..................................................... E04B 2/74
[52] U.S. Cl. ................................. 52/585.1; 52/DIG. 13; 24/306
[58] Field of Search .......................... 52/585.1, DIG. 13; 403/13, 14, 375, 245, 263, 188, DIG. 10; 24/306, 442

[56] References Cited

U.S. PATENT DOCUMENTS

| | | | |
|---|---|---|---|
| 3,851,357 | 12/1974 | Ribich et al. | 24/306 |
| 3,916,703 | 11/1975 | Ribich et al. | 24/306 |
| 4,271,566 | 6/1981 | Perina | 52/DIG. 13 X |
| 4,680,838 | 7/1987 | Astl | 24/442 |
| 4,883,331 | 11/1989 | Mengel. | |
| 4,966,421 | 10/1990 | Mengel. | |
| 5,058,245 | 10/1991 | Saito. | |

FOREIGN PATENT DOCUMENTS

0465983A1  1/1992  European Pat. Off..

*Primary Examiner*—Carl D. Friedman
*Assistant Examiner*—Yvonne Horton-Richardson
*Attorney, Agent, or Firm*—Hill, Steadman & Simpson

[57] ABSTRACT

A joint structure for joining two panel-like components includes a fitting pin member having a flange portion and pin portions equivalent to a dowel. One strip of a surface-type fastener having a number of identical fastener elements is provided on opposite surfaces of the flange portion. A mating surface of each of the panel-like components has a recessed portion for being fitted with the flange portion, and a pin hole formed in a bottom surface of the recessed portion. The other strip of the surface-type fastener which is engageable with the surface-type fastener strip is disposed on the bottom surface of the recessed portion. The two surface-type fastener strips are firmly engaged together when the flange portion and the pin portions are fitted in the recessed portions and the pin holes, respectively, so that the two panel-like components are firmly joined together. Since the surface-type fastener strips do not project from the mating surfaces of the panel-like components, the fastener elements are protected against damage during transportation and assembling work and can provide the desired fastening strength.

7 Claims, 7 Drawing Sheets

JOINT STRUCTURE OF PANEL-LIKE COMPONENTS

BACKGROUND OF THE INVENTION

1. Field of the Invention

The present invention relates to a joint structure for joining together various panel components and/or rod components for assembling office-use furniture or home-use furniture, such as tables, chairs, shelves, etc. In this specification, panel components and rod components are hereinafter referred to as panel-like components.

2. Description of the Prior Art

Insofar as furniture is concerned, whether it may be office-use furniture or home-use furniture, the so-called "knock-down" type furniture, which is assembled on-site when delivered point rather than when produced, has become increasingly popular in recent years.

A most important point for the knock-down furniture is positioning or location between related parts or components. Furthermore, in assembling the knock-down furniture, an extensive on-site adjustment is substantially impossible. Accordingly, the knock-down furniture must have a simple joint structure which enables easy assembling and be able to retain the necessary post-assembling strength and rigidity.

In view of these requirements, various attempts have been proposed heretofore to provide a joint structure for joining panels of the knock-down furniture. One such prior joint structure is disclosed in U.S. Pat. Nos. 4,883,331 and 4,966,421. The disclosed joint structure includes two dowel holes (matching apertures) formed, for a purpose of positioning, in a mating surface of each of two panels to be connected, one part of a hook-and-loop fastener having a number of male fastener elements or hooks attached to the mating surface of one of the panels over the entire area except a portion defining the dowel holes, and the other part of the hook-and-loop fastener having a number of female fastener flements or loops attached to the mating surface of the other panels over the entire area except a portion defining the dowel holes. In assembling of the panels, the two dowels are fitted in the corresponding pair of confronting dowel holes to position the panels and, at the same time, the two surface-type fastener portions provided on the mating surfaces except the area for the dowel holes are engaged together to connect the panels.

The knock-down furniture is packed in various forms for a purpose of transportation to the assembling site. In order to maintain the handling facility during transportation and the working facility during assembling, the volume of a packed knock-down furniture should preferably be compacted as small as possible. The knock-down furniture is generally packed in such a condition that a plurality of panels are stacked one above another.

According to the joint structure of the panels disclosed in the two U.S. patents specified above, both portions of the hook-and-loop fastener are attached in an exposed condition to the corresponding mating surfaces of the panels. Since the panels are generally packed in a stacked condition as described above, the exposed fastener portions are likely to be subjected to a pressure or compressing force tending to deflect the hooks and loops into a collapsed condition in which instance the fastening ability or strength of the hook-and-loop fastener is considerably reduced. During the assembling work, hooks and/or loops are also susceptible to damage due to interference with other portions with the result that the fastening capability and strength of the hook-and-loop fastener is partly deteriorated.

In the joint structure disclosed in the aforesaid U.S. Patents, the mating surfaces of the panels are not directly engageable with each other because the hook-and-loop fastener is interposed between these two mating surfaces. The thus arranged hook-and-loop fastener deteriorates the appearance of a finished product. Furthermore, due to the elasticity of the hook-and-loop fastener, looseness of joint is unavoidable.

According to the same joint structure, two dowel holes are formed in each of tile mating surfaces of the panels in order to secure the desired positioning and alignment between the mating surfaces. However, since the dowel holes and the dowels engaged therein are both circular in cross section, if two or more dowel holes cannot be formed in the joint structure for some reasons, for instance when a leg of a table is to be attached to a top plate of the table by means of a single dowel engageable with a pair of aligned dowel holes formed in the top face of the leg and the backside of the top plate, the leg is likely to be attached in a misaligned condition relative to the top plate, thus requiring an adjustment which is tedious and time-consuming.

SUMMARY OF THE INVENTION

With the foregoing drawbacks in view, an object of the present invention is to provide a joint structure of panel-like components which is able to protect a surface-type fastener, generally known as a hook-and-loop fastener, from damage, can be assembled easily, is able to provide a high-quality final product with the panel-like components assembled together, with the surface-type fastener arranged in a concealed condition, and without producing looseness of joint.

To attain the foregoing object, the present invention seeks to provide a joint structure for jointing two panel-like components face to face, comprising: a fitting pin member having a flange portion and a pin portion projecting from one of opposite surfaces of the flange portion, each of the opposite surfaces of the flange portion being provided with one portion of a surface-type fastener having at least one of a number of male fastener elements or a number of female fastener elements; and a recessed portion formed in a mating surface of each of the two panel-like components for fitting engagement with the flange portion, the recessed portion having a bottom surface and the other portion of the surface-type fastener disposed on the bottom surface and having at least the female fastener elements or the male fastener elements engageable with the fastener elements on the flange portion, the recessed portion of at least one of the mating surfaces including a pin hole formed in the bottom surface of the recessed portion for fitting engagement with the pin portion of the fitting pin member.

According to one preferred embodiment, the recessed portions of the respective panel-like components have respective depths dimensioned such that when the one portion of the surface-type fastener provided on each of the opposite surfaces of the flange portion and the other portion of the surface-type fastener disposed on the bottom surface of a corresponding one of the recessed portions are engaged with each other, the mating surfaces of the panel-like components closely contact face to face. The recessed portions preferably have a non-circular shape in cross section, and the flange portion has such a cross-sectional shape as to be complementarily received in the recessed portions. The pin hole preferably has a non-circular shape in cross section, and the pin portion has such a cross-sectional shape as to be complementarily received in the shape of the pin hole.

In one preferred embodiment, the pin hole is formed in each of the recessed portions, and the fitting pin member further has a second pin portion projecting from the other surface of the flange portion. In another preferred embodiment, the pin hole is formed in only one of the recessed portions, and the fitting pin member has only one pin portion projecting from one of the opposite surfaces of the flange portion. As an alternative, the single pin portion may be used in combination with the pin hole formed in each of the recessed portions. The fitting pin member may be molded of a synthetic resin material, and the one portion of the surface-type fastener has a number of hooks integrally molded on each of the opposite surfaces of the flange portion.

To join the two panel-like components by means of the joint structure of the present invention, the flange portion and the pin portion of the fitting pin member are fitted in the recessed portion and the pin hole, respectively, of one panel-like component whereupon the one portion of the surface-type fastener on the flange portion and the other part of the surface-type fastener in the recessed portion are firmly engaged together. Then, a part of the flange portion and the opposite pin portion are fitted in the recessed portion and the pin hole, respectively, of the other panel-like component whereupon the one part of the surface-type fastener on the flange portion and the other portion of the surface-type fastener in the recessed portion are firmly engaged together.

According to the invention, since both portions of the surface-type fastener are disposed on the respective bottom surfaces of the corresponding recessed portions, they are not exposed from the mating surfaces of the panel-like components. Respective engagement surfaces of the two surface-type fastener portions are completely free from deflection with pressure during transportation and assembling work and are kept from getting caught by another portion with the result that the surface-type fastener can retain the desired fastening strength after the panel-like components are assembled together.

Furthermore, since the recessed portions in the respective mating surfaces and the corresponding flange portion of the fitting pin member and/or the pin holes and the corresponding pin portions are non-circular in cross section, once fitting engagement is completed between the recessed portions and the flange portion and/or between the pin holes and the pin portions, the joint portion is automatically positioned and, at the same time, the panel-like components are aligned into a predetermined relationship. In the case where alignment between the two panel-like components is not required, the recessed portions and the pin holes in the panel-like components, and the flange portion and pin portions of the fitting pin member may be circular in cross section. However, the aforesaid non-circular cross-sectional shape is preferable in general. The non-circular shape should by no means be limited to a polygon but may be a circle having on its circumference at least a projection, or an ellipse in which instance the predetermined aligned relationship can be secured between two panel-like components.

The above and other objects, features and advantages of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION

Certain preferred embodiments of the present invention will be described below in greater detail with reference to the accompanying drawings. A joint structure of the present invention includes a fitting pin member used for directly joining two panel-like parts or components, such as a top plate and each leg of a table, or adjoining panels of a bookshelf. The fitting pin member includes a flange portion each of two opposite surfaces of which is provided with one portion of a surface-type fastener, generally known as a hook-and-loop fastener, having at least one of a number of male fastener elements or hooks and a number of female fastener elements or loops. The panel-like components (hereinafter referred to for brevity as "panels") each have a mating surface in which is formed with a recessed portion in which the flange portion of the fitting pin member is fitted. The recessed portion has a bottom surface on which is disposed the other portion of the surface-type fastener having a number of fastener elements which are releasably engageable with the fastener elements of the one surface-type fastener portion. The recessed portion of at least one panel further has a pin hole extending downwards from a center of the bottom surface for fitting engagement with a pin portion of the fitting pin member projecting from at least one of the opposite surfaces of the flange portion. The one portion of the surface-type fastener may be composed of a strip of surface-type fastener material having a number of male or hook-shaped fastener elements, while the other portion of the surface-type fastener may be composed of a strip of surface-type fastener material having a number of female or looped fastener elements. As an alternative, each of the two fastener strips may include hook-shaped fastener elements and looped fastener elements in combination.

Figure 1:
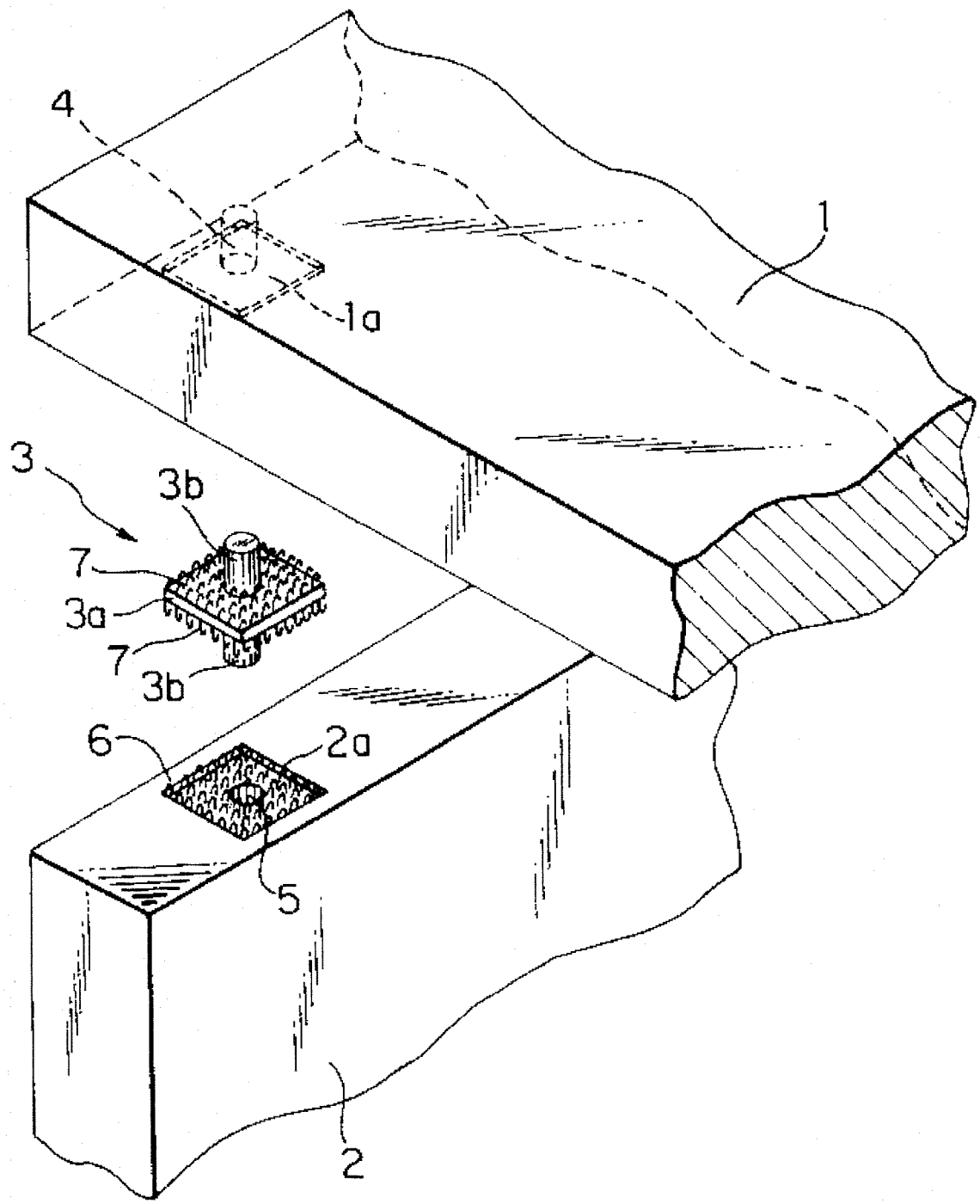
FIG. 1 is a perspective view showing the typical example of a joint structure of two panel-like components according to the present invention.

FIG. 1 illustrates a typical example of the joint structure of two adjoining panels. In the illustrated embodiment, a first panel 1 and a second panel 2 are joined face to face by the fitting pin member 3 along the periphery of an undersurface of the first panel 1 and a top surface of the second panel 2. To this end, a portion of the undersurface of the first panel 1 and a portion of the top surface of the second panel 2 that form a joint portion together with the fitting pin member 3 have recessed portions 1a and 2a, respectively. The recessed portions 1a, 2a shown in the illustrated embodiment have the same shape and are composed of a rectangular recession. The recessed portions 1a, 2a each have a pin hole 4, 5 formed at a center of the bottom surface of the corresponding recessed portion 1a, 2a. A strip 6 as a portion of surface-type fastener having a number of identical fastener elements, such as hooks or loops, is attached by adhesive bonding to the bottom surface of the recessed portion 1a, 2a over the entire area except a central portion defining an end of the pin hole 4, 5.

The fitting pin member 3 includes, as shown in FIG. 1, a rectangular flange portion 3a provided for fitting engagement with the opposite recessed portions 1a,2a of the panels 1, 2, and a pair of aligned cylindrical pins 3b, 3b projecting respectively from respective centers of opposite surfaces of the flange portion 3a. The opposite surfaces of the flange portion 3a each have a strip 7 as a portion of surface-type fastener attached thereto by adhesive bonding and having a number of fastener elements which are releasably engageable with the fastener elements on the surface-type fastener strip 6 attached to the bottom surface of each of the recessed portions 1a, 2a.

Figure 2:
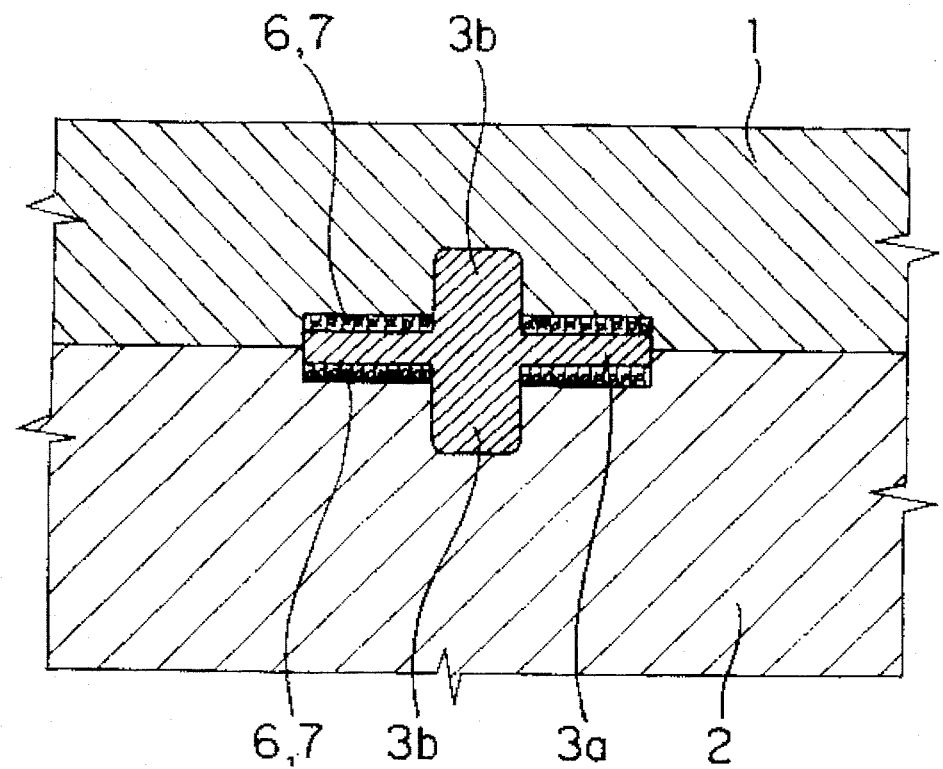
FIG. 2 is a cross-sectional view of the panel-like components as they are assembled together via the joint structure.

Respective depths of the recessed portions 1a,2b are dimensioned such that when each of the surface-type fastener strips 6, 6 bonded to the bottom surfaces of the respective recessed portions 1a, 2a and a corresponding one of the surface-type fastener strips 7, 7 bonded to the opposite surfaces of the flange portion 3a are engaged together, the mating surface (i.e., the undersurface) of the first panel 1 and the mating surface (i.e., the top surface) of the second panel 2 contact closely face to face. FIG. 2 illustrates in cross section a joint portion of the first and second panels 1, 2 connected together by the fitting pin member 3. As shown in the same figure, the recessed portions 1a and 2a are symmetrical about a horizontal plane and have the same depth.

As described above, since the surface-type fastener strips 6, 6 are bonded to the bottom surfaces of the corresponding recessed portions 1a, 2a of the first and second panels 1, 2, they are not exposed from the mating surfaces of the panels 1, 2. Respective engagement surfaces of the two surface-type fastener strips 6, 6 are, therefore, completely free from deflection with pressure during transportation and assembling work and are also kept from getting caught by another part. Accordingly, the surface-type fastener can retain the desired fastening strength while the panels are in the assembled condition.

Figure 3:
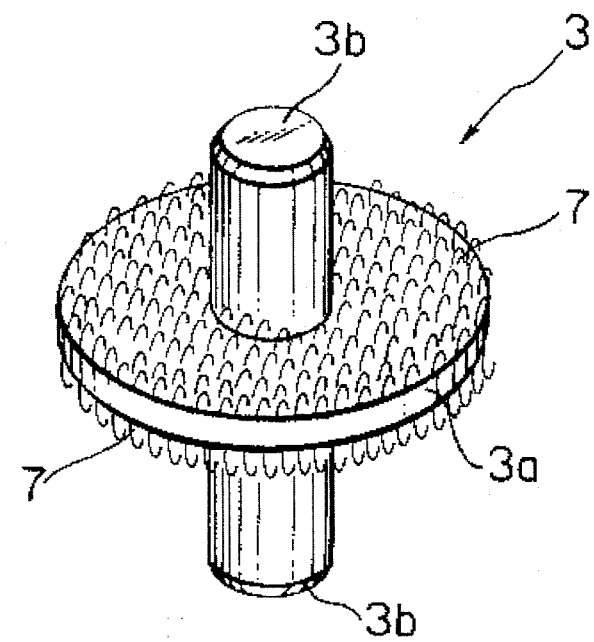
FIG. 3 is a perspective view showing one form of a fitting pin member which can be used with in joint structure of the present invention.
Figure 4:
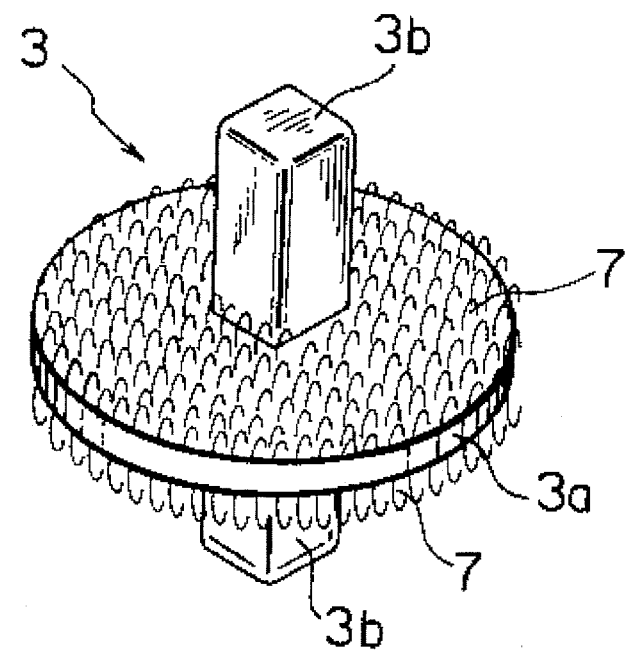
FIG. 4 is a perspective view showing a modified form of the fitting pin member.
Figure 5:
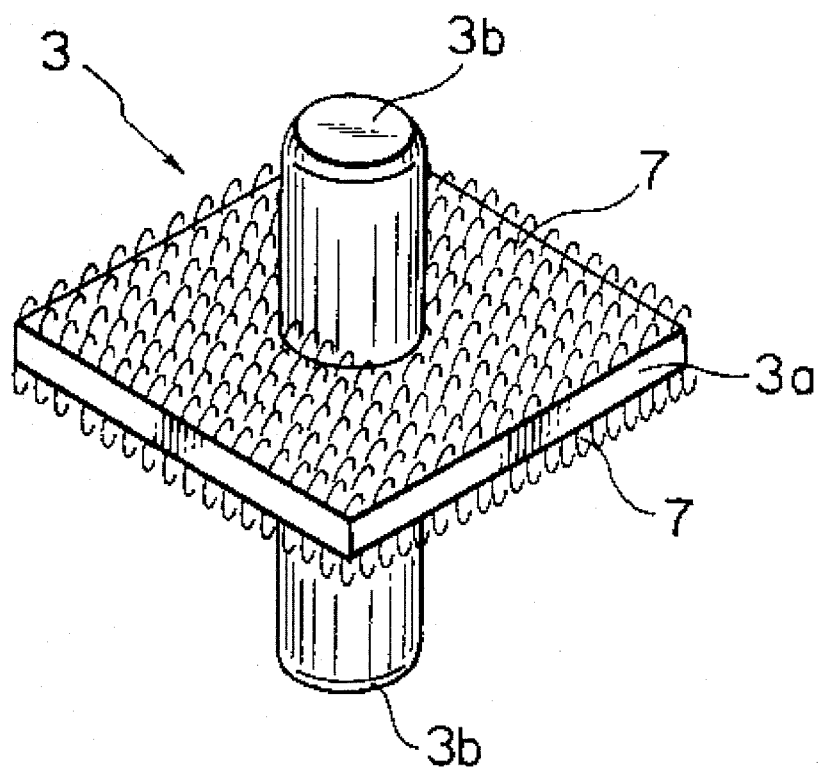
FIG. 5 is a perspective view of a fitting pin member used in the joint structure shown in FIG. 1.
Figure 6:
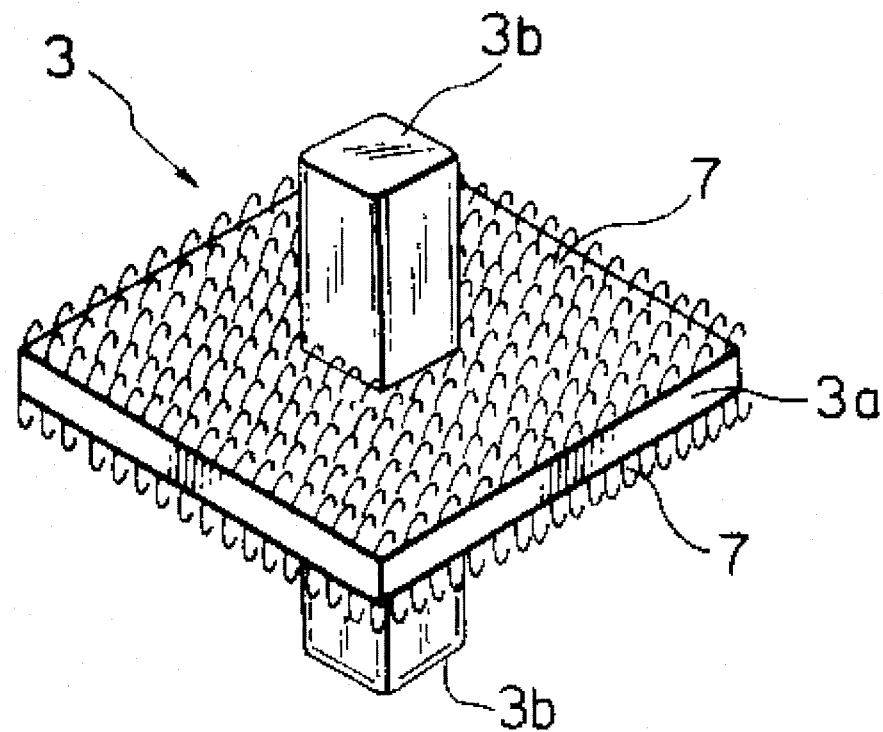
FIG. 6 is a perspective view showing another modified form of the fitting pin member.
Figure 7:
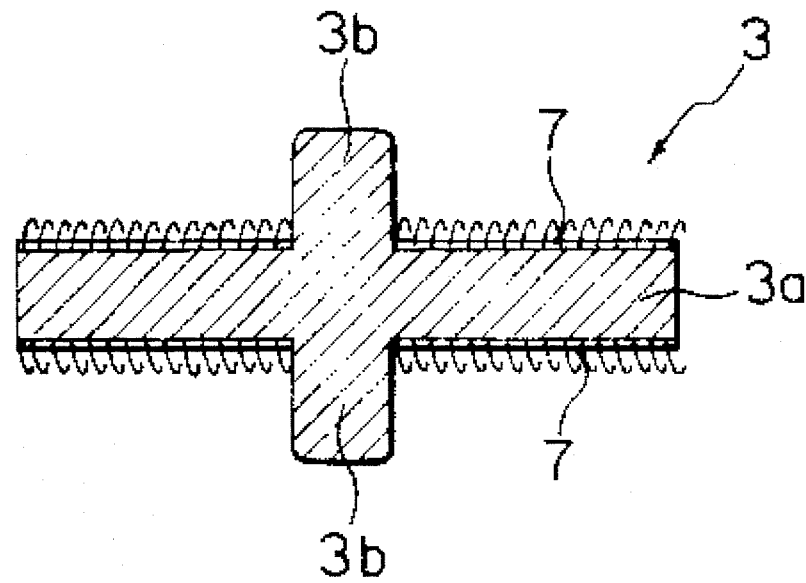
FIG. 7 is a longitudinal cross-sectional view showing still another modified form of the fitting pin member.

In the embodiment shown in FIG. 1, the recessed portions 1a, 2a and the flange portion 3a, better shown in FIG. 5, are rectangular in shape. Accordingly, once the recessed portions 1a, 2a and the flange portion 3a are engaged together, the joint portion is automatically set in a predetermined position and, at the same time, the panels 1, 2 are automatically aligned in a predetermined relationship even when the pin holes 4, 5 and the pin portions 3b, 3b have a circular shape in cross section. In the case where the alignment between the panels 1, 2 is not required, the flange portion 3a and the pin portions 3b, 3b may be circular in cross section as shown in FIG. 3. However, in general, the aforesaid cross-sectional shape is preferably non-circular, such as shown in FIG. 1. In the case where the flange portion 3a has a circular cross section, the pin portions 3b are preferably composed of a rectangular prism, as shown in FIG. 4. In this instance, the corresponding pin holes 4, 5 have such a shape as to be complementarily received in shape of the pin portions 3b, 3b so that the panels 1, 2 can be retained in a properly aligned condition with the pin holes 4, 5 and the corresponding pin portions 3b, 3b being firmly fitted together. The aforesaid non-circular shape used for the alignment between two panels 1, 2 should be by no means limited to the rectangular shape as previously mentioned but may also include an elliptical shape. As shown in FIG. 6, both of the flange portion 3a and the pin portions 3b, 3b may be rectangular in cross section in which instance the recessed portions 1a, 2a and the pin holes 4, 5 should be rectangular in cross section.

Figure 8:
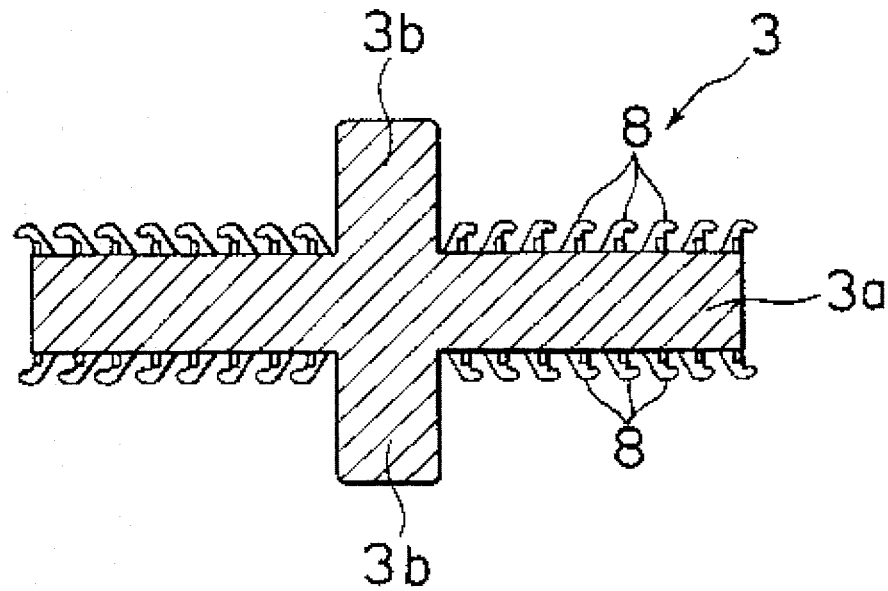
FIG. 8 is a longitudinal cross-sectional view showing yet another modified form of the fitting pin member.

FIGS. 3 through 9 also illustrate various structural examples of the surface-type fastener portion provided on the flange portion 3a of the fitting pin member 3. In general, a strip 7 as a portion of surface-type fastener, carrying on its one surface a number of hook-shaped fastener elements formed of monofilaments woven with multifilament yarns of the fabric, is attached by adhesive-bonding to each of the opposite surfaces of the flange portion 3a, as shown in FIG. 3. It is possible to form a fitting pin member 3 by integrally molding hook-shaped fastener elements 8 and a flange portion 3a, which forms a surface-type fastener poriton as shown in FIG. 8, instead of using the hooked surface-type fastener strip 7. The hook-shaped fastener elements 8 can also be molded integrally with the bottom walls of the recessed portions 1a, 2a. However, since the recessed portions 1a, 2a are generally liable to collect dust and dirt, the surface-type fastener portion disposed in the recessed portions 1a, 2a should preferably be replaceable for removing the dirt and dust. It is accordingly preferable that the hook-shaped fastener elements 8 are formed by integral molding on the flange portion 3a of the fitting pin member 3.

Figure 9:
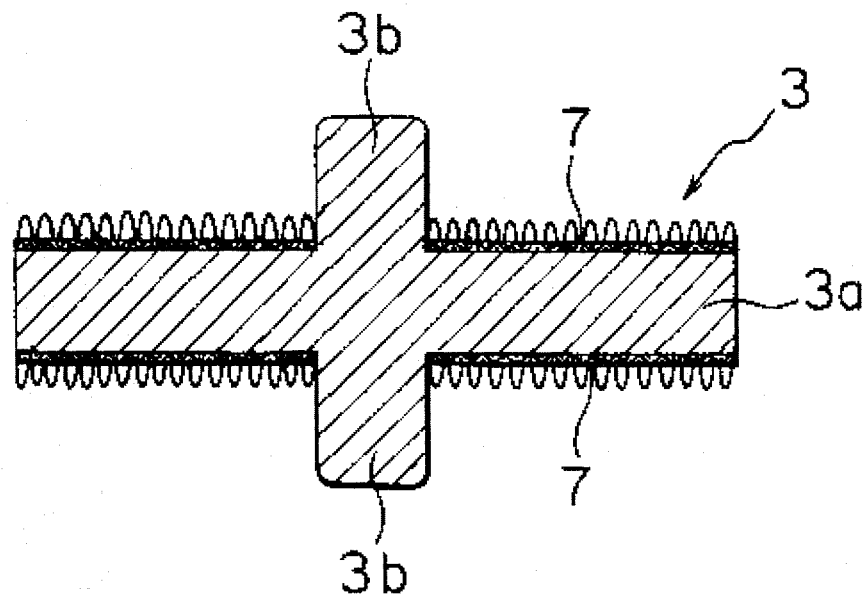
FIG. 9 is a longitudinal cross-sectional view showing another modified form of the fitting pin member.

The fastener elements of the surface-type fastener strip 7 provided on the flange portion 3a should be by no means limited to the hook-shaped fastener elements but may be composed of looped fastener elements formed on one surface of a surface-type fastener strip 7 which is attached by adhesive bonding to each of the opposite surfaces of the flange portion 3a, as shown in FIG. 9. In this instance, the surface-type fastener strip 6 disposed on the bottom surface of each of the recessed portions 1a, 2a has a number of hook-shaped or mushroom-shaped male fastener elements which are releasably engageable with the looped fastener elements on the mating surface-type fastener strip 7 attached to the flange portion 3a.

Further, the surface-type fastener strip 7 provided on one surface of the flange portion 3a may be composed of hook-shaped and looped fastener elements in combination. In this instance, the surface-type fastener strip 6 disposed on the bottom surface of each of the recessed portions 1a, 2a is also composed of both hook-shaped and looped fastener elements so as to be releasably engageable with the fastener elements on the surface of the flange portion 3a. Alternatively, the flange portion 3a may have on one surface thereof hook-shaped fastener elements, and on the other surface looped fastener elements.

When two panels 1, 2 are to be connected by the joint structure of the present invention described above, the flange portion 3a and one of the pin portions 3b are fitted in the recessed portion 1a or 2a and the pin hole 4 or 5, respectively, of one of the first and second panels 1, 2 whereupon confronting two fastener strips 6, 7 of the surface-type fastener are firmly engaged together. Then, a portion of the flange portion 3a and the other pin portion 3b are fitted in the recessed portion 2a or 1a and the pin hole 5 or 4, respectively, of the other of the first and second panels 1, 2 whereupon confronting two fastener strips 6, 7 are firmly engaged together. Connection between the first and second panels 1, 2 is thus completed.

Figure 10:
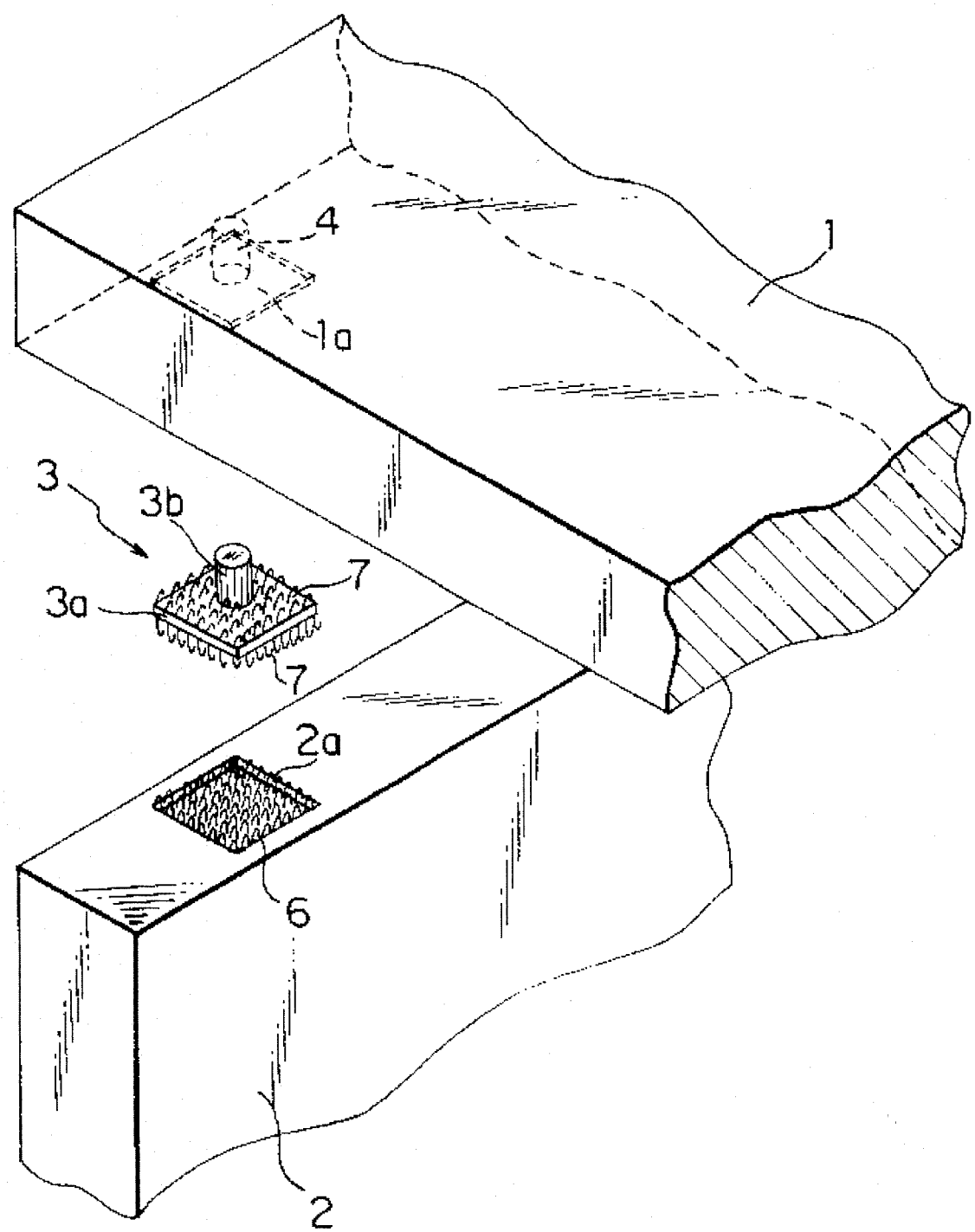
FIG. 10 is a perspective view of a joint structure of two panel-like components according to another embodiment of the present invention.
Figure 11:
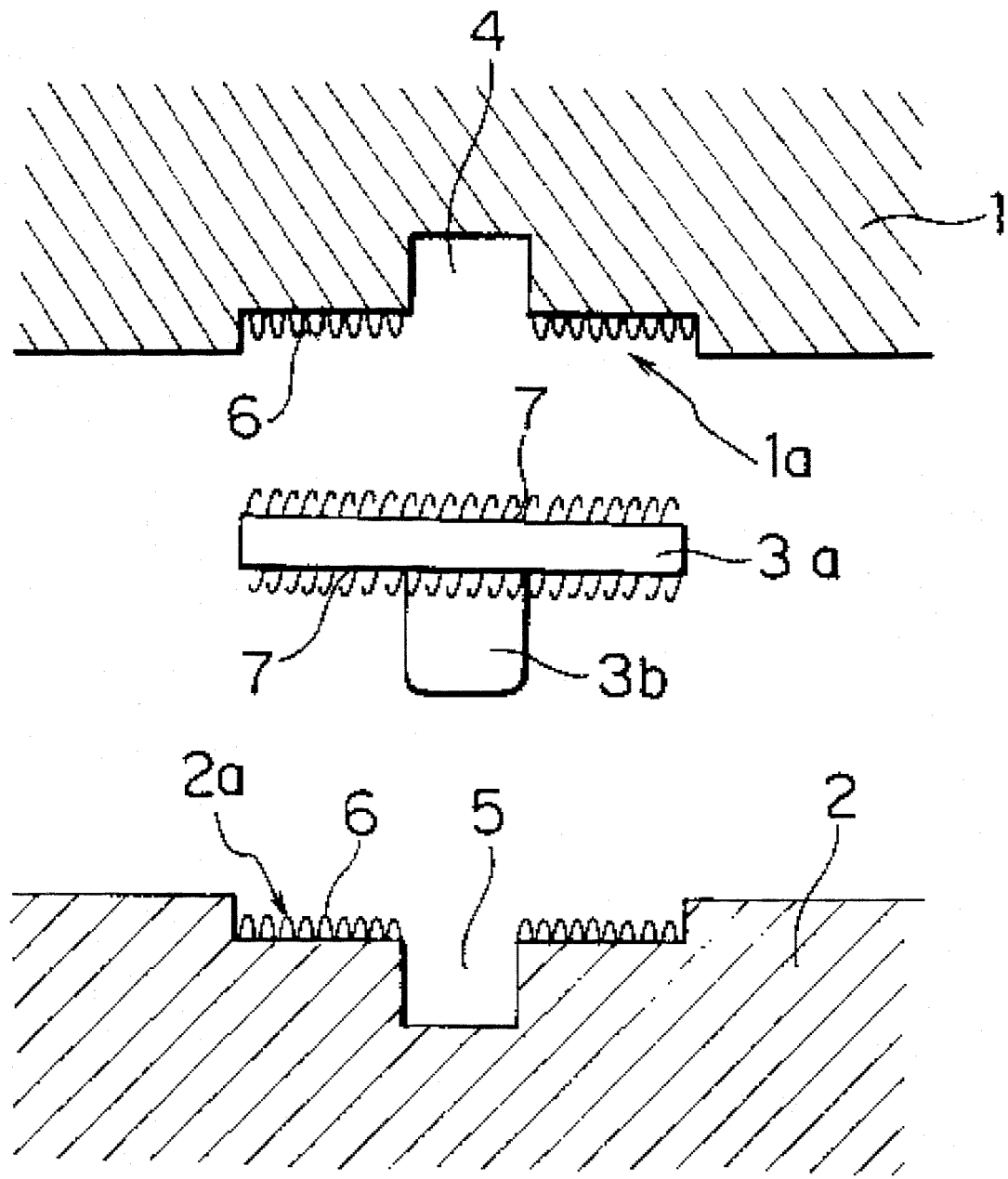
FIG. 11 is a front elevational view, partly in cross section, of a modified form of the joint structure shown in FIG. 10.

Another preferred embodiment of the present invention shown in FIG. 10 differs from the embodiment of FIG. 1 in that the fitting pin member 3 has only one pin portion 3b projecting from one surface of the flange portion 3a. In this embodiment, a peripheral edge portion of the undersurface of the first panel 1 has a recessed portion 1a including a pin hole 4, whereas the top surface of the second panel 2 only has a recessed portion 2a which is devoid of the pin hole. In the case of the illustrated embodiment, the depth of the recessed portion 2a and the thickness of the flange portion 3a are enlarged correspondingly. This arrangement is advantageous in that the joined or assembled panels 1 and 2 can be held stable without causing wobbling. The joint structure of the second embodiment is simple in construction but is able to achieve the same functional effects as the joint structure of the first embodiment described above and also able to provide a rigid joint between the first and second panels 1, 2. As shown in FIG. 11, the fitting pin member 3 shown in FIG. 10 can be used in combination with the first and second panels 1, 2 shown in FIG. 1 which have two confronting pin holes 4, 5 formed in the bottom surfaces of the corresponding recessed portions 1a, 2a. In this instance, the pin portion 3b of the fitting pin member 3 can be set in each of the pin holes 4, 5 of the first and second panels 1, 2, so that the efficiency of assembling operation can be improved.

It is apparent from the foregoing description that the joint structure for joining two adjoining panel like parts or components according to the present invention does not rely on the use of dowels in combination with a surface-type fastener as employed in the conventional joint structure. The joint structure of the present invention includes a fitting pin member 3 which is provided with a flange portion 3a in addition to a pair of aligned pin portions 3b corresponding in structure and function to the conventional dowel. The flange portion 3a has one strip of a surface-type fastener 7 disposed on each of the opposite surfaces of the flange portion 3a and having a number of fastener elements. The panel-like components each has a mating surface in which is formed a recessed portion 1a, 2a for snugly receiving therein the flange portion 3a. The recessed portion 1a, 2a has a pin hole 4, 5 formed at a center of the bottom surface for snugly receiving therein the corresponding pin portion 3b, and the other strip of the surface-type fastener disposed on the bottom surface of the recessed portion 1a, 2a for engagement with the surface-type fastener strip 7 on the flange portion 3a. With this arrangement, the flange portion 3a and the pin portions 3b of the fitting pin member 3 are fitted in the recessed portions 1a, 2a and the corresponding pinholes, 4, 5, respectively, of the panel-like components so as to assemble the panel-like components. Concurrently therewith, confronting pairs of the surface-type fastener strips 6, 7 are firmly engaged together with the result that the panel-like components are firmly joined together. Since the surface-type fastener strips 6, 7 are not exposed from the mating surfaces of the panel-like components, the fastener elements on the surface-type fastener are protected against damage during transportation and assembling work and hence are able to provide the desired fastening strength without deterioration.

Furthermore, differing from the conventional joint structure in which looseness of joint is likely to be produced due to a surface-type fastener interposed between two opposed mating surfaces of the panel-like components, the joint structure of this invention is free from the same problem because respective depths of the recessed portions 1a, 2a are dimensioned such that when the panel-like components are joined together by the fitting pin member 3, the mating surfaces of the panel-like components contact closely face to face. The thus assembled panel-like components are attractive in appearance and completely free from looseness of joint so that a product of high quality can be obtained.

According to this invention, the flange portion 3a and/or the pin portions 3b of the fitting pin member 3 preferably have a non-circular cross section, and the recessed portions 1a, 2a and the pin holes 4, 5 have the same cross-sectional shapes as the flange portion 3a and the pin portions 3b, respectively, for ensuring close fitting engagement with the flange portion 3a and the pin portions 3b. With this arrangement, the panel-like components can automatically be aligned in a predetermined relationship when they are connected together via the fitting pin member 3.

Obviously, various minor changes and modifications of the present invention are possible in the light of the above teaching. It is therefore to be understood that within the scope of the appended claims the invention may be practiced otherwise than as specifically described.

What is claimed is:

1. A joint structure for jointing two panel-like components face to face, comprising:

a fitting pin member having a flange portion and a pin portion projecting from one of opposite surfaces of said flange portion, each of said opposite surfaces of said flange portion being provided with one portion of a surface-type fastener having at least one of a number of male fastener elements and a number of female fastener elements; and a recessed portion formed in a mating surface of each of the two panel-like components for fitting engagement with said flange portion, said recessed portion having a bottom surface and the other portion of said surface-type fastener disposed on said bottom surface and having at least said female fastener elements or said male fastener elements, said recessed portion of at least one of the mating surfaces including a pin hole formed in the bottom surface of said recessed portion for fitting engagement with said pin portion of said fitting pin member.

2. A joint structure according to claim 1, wherein said recessed portions of the respective panel-like components have respective depths dimensioned such that when said one portion of the surface-type fastener provided on each of the opposite surfaces of said flange portion and said other portion of the surface-type fastener disposed on the bottom surface of a corresponding one of said recessed portions are engaged with each other, said mating surfaces of the panel-like components closely contact face to face.

3. A joint structure according to claim 1, wherein said pin hole is formed in each of said recessed portions, and said fitting pin member has pin portions projecting from the opposite surfaces of said flange portion.

4. A joint structure according to claim 1, wherein said pin hole is formed in either of said recessed portions, and said fitting pin member has a pin portion projecting from either of the opposite surfaces of said flange portion.

5. A joint structure according to claim 1, wherein said recessed portions have a non-circular shape in cross section, and said flange portion has such a cross-sectional shape as to be complementarily received in said recessed portions.

6. A joint structure according to claim 1, wherein said pin hole has a non-circular shape in cross section, and said pin portion has such a cross-sectional shape as to be complementarily received in said pin hole.

7. A joint structure according to claim 1, wherein said fitting pin member is molded of a synthetic resin material, and said one portion of the surface-type fastener has a number of hooks integrally molded on each of said opposite surfaces of said flange portion.

* * * * *